3,415,884
PROCESS FOR MANUFACTURING CYCLAMEN
ALDEHYDE AND ITS DERIVATIVES
Tsutomu Kuwata, Tokyo, Tadashi Yasukawa, Zushi-shi, and Shozo Abe, Tokyo, Japan, assignors to Soda Koryo Kabushiki Kaisha, Tokyo, Japan, a corporation of Japan
Filed Feb. 15, 1965, Ser. No. 432,552
Claims priority, application Japan, Apr. 22, 1964, 39/22,396
2 Claims. (Cl. 260—599)

ABSTRACT OF THE DISCLOSURE

A process for manufacturing cyclamen aldehyde and derivatives thereof by reacting in the vapor phase at least one aromatic aldehyde having carbon-carbon double bond in the side chain thereof with at least one compound selected from saturated primary and secondary alcohols and hydrogen in the presence of a hydogenation or dehydrogenation catalyst. The reaction is conducted at a temperature of about 150° to 500° C. under a reduced pressure to effect the hydrogenation of the double bond of the side chain only. By this process it is possible to produce the cyclamen aldehyde and its derivatives in high yield and without unwanted impurities which can not be tolerated in the product useful as a perfume.

---

Figure 1:
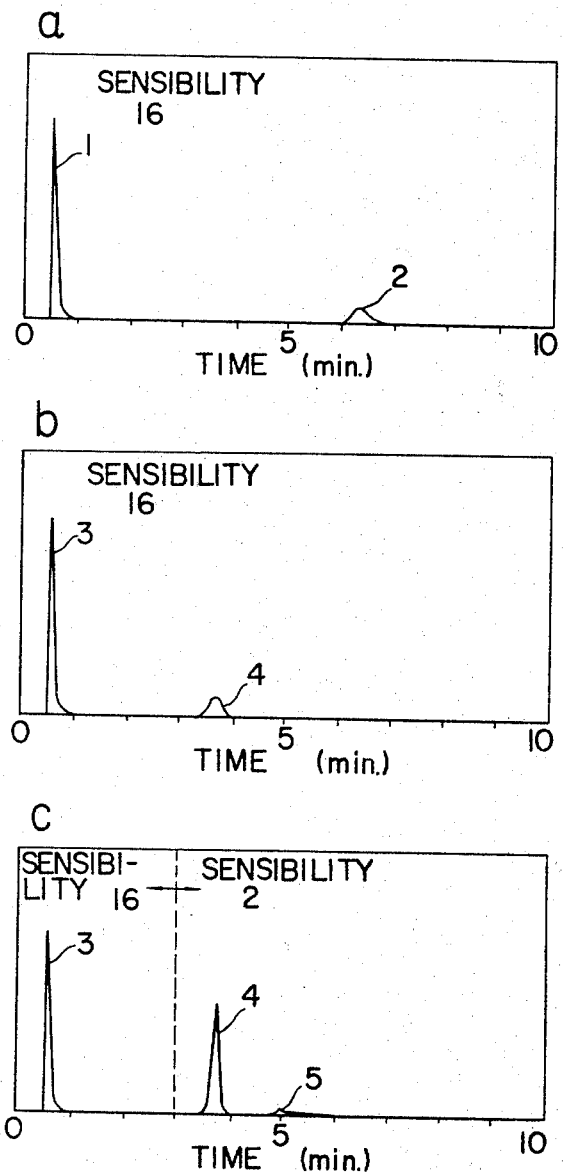

The present invention relates to a process for manufacturing hydrocinnamic aldehyde or its alkyl substitutes. More particularly, the present invention relates to a process for manufacturing cyclamen aldehyde (p-isopropyl-α-methyl hydrocinnamic aldehyde) and its derivatives almost quantitatively which comprises reacting in the vapor phase at least one of the aromatic aldehydes containing carbon-carbon double bonds in the side chain which can be indicated by the following general formula:

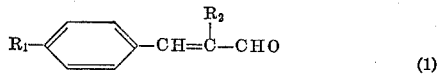

(1)

(Where: $R_1$ and $R_2$ are radicals selected from the group consisting of hydrogen and alkyl radicals. $R_1$ and $R_2$ may be of the same or different kinds.)

with at least one of the compounds selected from the group consisting of saturated primary alcohols, saturated secondary alcohols and hydrogen in the presence of a catalyst, at temperatures of about 150 to 500° C., or preferably 200 to 400° C. and under evacuated conditions, and thereafter hydrogenating only the aforementioned double bonds to produce the corresponding saturated aldehyde, namely, cyclamen aldehyde (where $R_1$ is an isopropyl radical and $R_2$ a methyl radical) expressed by the following formula:

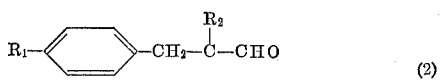

(2)

(Where: $R_1$ and $R_2$ respectively represent the same radicals as those of the Formula 1.)

and also its derivatives including, for instance, the cases where $R_1$ and $R_2$ represent hydrogen, where either one of $R_1$ and $R_2$ is hydrogen and the other alkyl radicals, and where $R_1$ and $R_2$ represent combinations of alkyl radicals other than those contained in cyclamen aldehyde. It should be understood that the derivatives from cyclamen aldehyde as used in the present invention represent the foregoing types.

The previous method of manufacturing cyclamen aldehyde or its derivatives by selective hydrogenation of unsaturated aldehydes involved reaction which was carried out at relatively low temperatures of 100° C. or below, with or without solvent, by the use of Ni as hydrogenation catalyst, and at atmospheric pressure or additional pressure of about 100 kg./cm.² Even under such conditions, the previous method could not obtain satisfactory results in selectively hydrogenating only raw unsaturated aldehydes into saturated ones, although special Ni-type hydrogenation catalyst was used.

The inventors have studies a process for carrying out industrially advantageous reaction without the restrictions of the previous method with respect to raw aromatic aldehydes containing carbon-carbon double bonds in the side chain. As a result, they have discovered that selective hydrogenation can be carried out very constantly and completely free from such restrictions as imposed on the previous method by conducting the vapor phase reaction of a reaction system consiting of the aforementioned combinations of systems at relatively high temperatures, under evacuated conditions and in the presence of known dehydrogenation catalysts capable of producing carbonyl compounds from alcohols or of known hydrogenation catalysts. They have also discovered that not only hydrogen, but also saturated primary and secondary alcohols can be favorably used as the source of hydrogen.

Therefore, the object of the present invention is to provide by selective hydrogenation of aromatic aldehydes (which may sometimes be referred to as aromatic unsaturated aldehydes) containing carbon-carbon double bonds in the side chain as indicated by the aforementioned general Formula 1 a process for manufacturing the corresponding saturated aldehydes, namely, cyclamen aldehyde expressed by the aforesaid general Formula 2 or its derivatives without the restrictions which handicapped the previous method in raw materials, catalysts and many other respects.

For better understanding of the present invention, further description will be made hereinafter with reference to the manufacture of cyclamen aldehyde. Cyclamen aldehyde (p-isopropyl-α-methyl hydrocinnamic aldehyde) is a valuable perfume having an aroma suggestive of cyclamen, lily of the valley, lillac, etc. For indusrial production, the method invented by Knorr et al. in 1932 [United States Patent No. 1,844,013 (1932) issued to Knorr and Weissenborn, Winthrop Chemical Co.] seems to be most common. Knorr et al. synthetized cyclamen aldehyde (II) by selective hydrogenation of the carbon-carbon double bonds in the side chain contained in p-isopropyl-α-methyl cinnamic aldehyde (I), which is obtained by the Claisen condensation of cuminic aldehyde (p-isopropyl benzaldehyde) and propionic aldehyde, in the solution of ethyl alcohol or benzene with a nickel catalyst at 100° C. and under pressure. According to this method, however, selective hydrogenation from (I) to (II) is not complete, and some amounts of yellow unreacted material (I) which releases undesirable odor are left in the product. Moreover, due to difficulties in complete removal of (I) from the product (II), the fragrance and color of the product are impaired (Paul Z. Bedoukian: "Perfumery Synthetics and Isolates," p. 186 (1951), D. Van Nostrand Company, Inc., New York). Nor the Raney nickel catalyst has good selectivity in selective hydrogenation of the carbon-carbon double bonds in the side chain contained in (I) (Niitani: "Nokanin," 29, 91, 94 (1955)).

The present invention is based on the discovery that when (I) is reacted with at least one of the primary alcohols (III) or secondary alcohols (IV) by passing them over the catalyst at high temperatures and under reduced pressures (III) or (IV) is dehydrogenated into its corresponding aldehydes or ketones, and that only the carbon-carbon double bonds in the side chain contained in (I), which is unsaturated aldehyde, undergo almost quantitatively selective hydrogenation by the hydrogen which is also generated as by-product, and thus are converted into the corresponding saturated aldehyde, namely, the product (II). It was also found that the substitution of hydrogen gas for (III) or (IV) attained the similar selective hydrogenation. Thus the inventors have confirmed that it is possible to manufacture cyclamen aldehyde, an extremely high grade perfume, by an easy operating process and with a high yield.

Further objects and advantages of the present invention will be more clearly understood from the following description. The conversion of the aforementioned aromatic unsaturated aldehydes into the corresponding saturated aldehydes, namely, cyclamen aldehyde or its derivatives using the process of the present invention may be indicated by the following Formula 3.

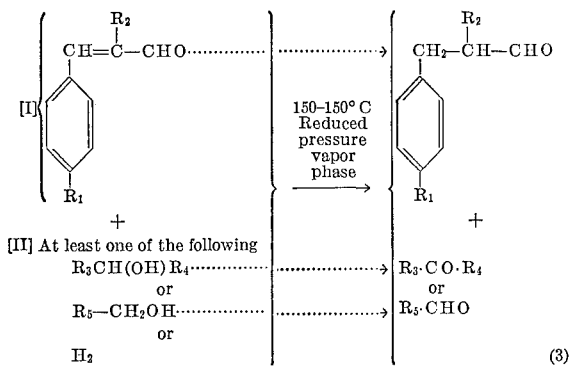

(Note: I is reacted with II. $R_1$ and $R_2$ respectively represent the same radicals as those shown in the Formula 1. Any of $R_3$ to $R_5$ represents aromatic hydrocarbon radicals with side chains or aliphatic hydrocarbon radicals with or without side chains.)

Noting that as seen from the Formula 3, when used with unsaturated aldehydes, saturated secondary alcohols ($R_3CH(OH)R_4$) or saturated primary alcohols $$(R_5—CH_2OH)$$

are converted into the corresponding ketones ($R_3COR_4$) or aldehydes ($R_5$—CHO), the process of the present invention may be deemed as a mere modification of the dehydrogenation process conducted in the vapor phase and at reduced pressure. However, the key point of the present invention lies in the fact that while the saturated secondary or primary alcohols are converted into the corresponding saturated ketones or aldehydes, hydrogen is also released and selectively hydrogenates the aforementioned aromatic unsaturated aldehydes into the corresponding saturated aldehydes. Another important feature of the present invention is the discovery that said hydrogenation can be effectively achieved at relatively high temperatures and under evacuated conditions. Therefore it is reasonable to consider the aforementioned, saturated secondary and primary alcohols as a source of hydrogen required in the selective hydrogenation of unsaturated aldehydes or ketones in the vapor phase and at reduced pressure. The use of hydrogen gas in place of said alcohols similarly produces good results. However, this is purely a hydrogenation process. The aforementioned type of reaction used in the process of the present invention is not found in any literature describing the previous methods of producing cyclamen aldehyde and its derivatives.

As clearly seen from the aforementioned Formula 3, the reaction claimed in the present invention which involves the use of at least one of the aforesaid aromatic unsaturated aldehydes as the starting material may be deemed as a sort of selective hydrogenation of unsaturated aldehydes into saturated ones. However, the fact that the process of the present invention is essentially different from any of the previous selective hydrogenation methods and excels over them from the industrial standpoint will be more clearly understood from the following description:

(1) The previous selective hydrogenation was conducted under mild conditions in order to ensure selectivity. In other words, reaction was carried out at low temperatures of 100° C. or below. In contrast, the process of the present invention is characterized by the fact that reaction takes place at temperatures of more than about 150° C., or preferably about 150 to 500° C., or still more preferably at temperatures as high as about 200 to 400° C.

(2) Referring to pressure used in the reaction, the previous method conducted reaction at atmospheric or additional pressures. In the process of the present invention, however, the reaction of hydrogenation is effectively accomplished at reduced pressures and elevated temperatures.

(3) On the other hand, in the selective hydrogenation of the previous method, study is being made in recent times on the improvement of the hydrogenation catalyst itself rather than the aforementioned mild reaction conditions. According to the process of the present invention, however, large varieties of ordinary catalysts for dehydrogenation or hydrogenation can be directly used as above described.

(4) What is particularly important is that while the previous method could not satisfactorily carry out the hydrogenation of aromatic unsaturated aldehydes, for example, p-isopropyl-α-methyl cinnamic aldehydes, regardless of the reaction conditions and type of catalyst selected, the process of the present invention can convert considerably easily and almost quantitatively said aromatic unsaturated aldehydes into the corresponding saturated aldehydes, namely, cyclamen aldehyde and its derivates.

(5) The process of the present invention is one for manufacturing cyclamen aldehyde and its derivatives by carrying out continuous selective hydrogenation in the vapor phase, at elevated temperatures and under evacuated conditions. This type of reaction has not been described in any previous literature.

As above-mentioned, the process of the present invention is an industrially excelent process from the standpoint of its reaction. Furthermore, the following fact is good evidence that the process of the present invention is also excellent in actual industrial operation.

(6) As seen from the aforesaid Formula 3 and foregoing description, the process of the present invention concurrently carries out hydrogenation and dehydrogenation. Since the former is an exothermic reaction and the later an endothermic reaction, heat aborption is offset to provide an excellent heat balance. This considerably facilitates the engineering design of chemical industrial equipment. Where an exothermic or endothermic reaction alone is involved, the catlyst-filled reactor is subject to restrictions on the reaction pipe diameter due to uneven heat distribution, or it is necessary to employ a fluidized bed process which involves complicated operation. While, of course, the process of the present invention permits the application of the fluidized bed process, the present invention can be easily practiced by the filler-type reactor which is easy to operate. However, where the process of the present invention is operated using only hydrogen gas as a source of hydrogen for selective hydrogenation in the vapor phase and at reduced pressure, only an exothermic reaction occurs. Consequently it is possible to adopt the fluidized bed process in accordance with the scale of operation.

For the aromatic unsaturated aldehydes used in the process of the present invention which contain carbon-carbon double bonds in the said chain, it is desirable that in the aforementioned general formula 1, $R_1$ is one of the group consisting of hydrogen, methyl, ethyl, isopropyl, sec-butyl, and t-butyl, and $R_2$ one of the group consisting of hydrogen, methyl, ethyl, n-propyl, n-butyl, n-amyl, and n-hexyl. The most preferable types of such aldehydes are (p-alkyl-)α-alkyl cinnamic aldehydes, for example, α-methyl cinnamic aldehyde, α-amyl cinamic aldehyde, p-isopropyl-α-methyl cinnamic aldehyde, p-sec-butyl-α-methyl cinnamic aldehyde and p-t-butyl-α-methyl cinnamic aldehyde which all have carbon-carbon double bonds in the side chain.

Also the process of the present invention can be operated in the presence of aromatic unsaturated alcohols corresponding to the aforesaid Formula 1 which contains —$CH_2OH$ in place of the —CHO radical of the compounds indicated by said Formula 1. For instance, the process of the present invention permits the use of the aforementioned aromatic unsaturated aldehydes as raw material which have previously been hydrogenated by the previous method with copper-, nickel-, platinum-base hydrogenation catalysts at temperatures below 150° C., and at atmospheric or additional pressures. The hydrogenated products obtained by the above-mentioned previous method are considered to contain various combinations of the following four types of compound.

(1) Unsaturated aldehydes
(2) Unsaturated alcohols
(3) Saturated alcohols
(4) Saturated aldehydes At this time, the compounds (1)–(4) are present in the said hydrogenated product prepared from aromatic aldehyde, though in varying amounts. Compound (1) above is a starting material used in the process of this invention and compound (3) is a source of hydrogen supply, and compound (4) is an intended reaction product. Now, referring to compound (2), when unsaturated alcohol of compound (2) is reacted singly by passing it on a catalyst, we presume that it is dehydrogenated, under the reaction conditions characteristic of the process of this invention, to form corresponding unsaturated aldehyde and hydrogen. Consequently where the products of hydrogenation by the previous method contain sufficient amounts of said compound (3) and/or (2), said products can be used as the starting material for the process of the present invention, without charging any additional saturated alcohols or hydrogen. And when the aforementioned products of hydrogention by the previous method lack said saturated alcohols or hydrogen it is necesary to supply at least one of the group consisting of saturated primary and secondary alcohols and hydrogen in order to use the aforesaid hydrogenation products as the starting material for the process of the present invention. The relationship between these is shown in Formula 4.

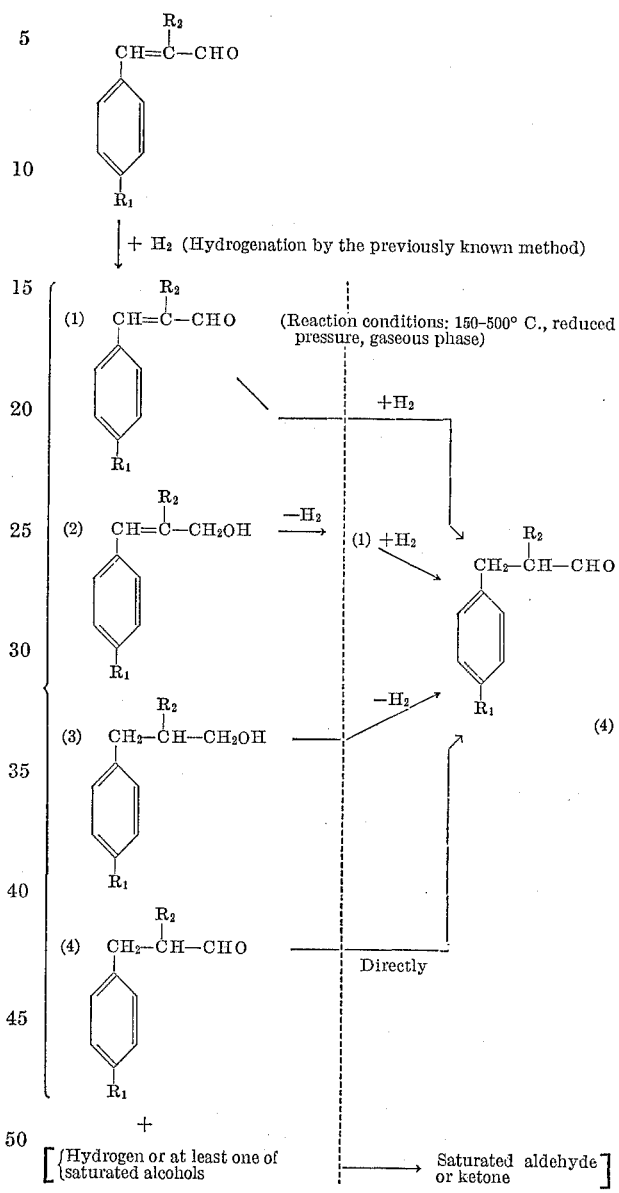

In the process of the present invention, saturated secondary alcohols which are easy to dehydrogenate and contain less amounts of by-products (such as esters, acids, etc.) are suitable as a source of hydrogen. However, saturated primary alcohols satisfactorily serve the same purpose. It is also desirable that the foregoing alcohols and the ketones or aldehydes obtained by their dehydrogenation should have sufficiently different boiling points from those or raw aromatic unsaturated aldehydes and/or saturated aldehydes produced therefrom to facilitate fractional distillation. Also if the aforesaid saturated alcohols are selected in such a manner that the aldehydes or ketones obtained by dehydrogenation of the saturated alcohols charged as a source of hydrogen can be used as one of the desired objects it is possible to carry out a most efficient production.

Alcohols containing up to 15 carbons are usually available as said saturated primary and secondary alcohols. These alcohols may consist of any of aliphatic, aromatic or cyclic alcohols. The aliphatic group may include, for example, methyl alcohol, ethyl alcohol, n-propyl alcohol, iso-propyl alcohol, n-butyl alcohol, sec-butyl alcohol, n-amyl alcohol, sec-amyl alcohol, n-hexyl alcohol, sec-hexyl alcohol, n-heptyl alcohol, sec-heptyl alcohol, methyl-n-amyl carbinol, n-octyl alcohol, methyl-n-hexyl carbinol, z-ethyl hexanol, n-nonyl alcohol, methyl-n-heptyl carbinol, n-decyl alcohol, n-undecyl alcohol, etc. The aromatic group may comprise, for example, benzyl alcohol, anisic alcohol, p-isopropyl benzyl alcohol, p-sec-butyl benzyl alcohol, p-t-butyl benzyl alcohol, methyl-phenyl carbinol, $\beta$-phenylethyl alcohol, $\gamma$-phenlpropyl alcohol, $\alpha$-methyl hydrocinnamic alcohol, $\alpha$-amyl hydrocinnamic alcohol, p-isopropyl-$\alpha$-methyl hydrocinnamic alcohol, p-sec-butyl-$\alpha$-methyl hydrocinnamic alcohol, p-t-butyl-$\alpha$-methyl hydrocinnamic alcohol, etc. The cyclic group may consist of cyclohexanol, etc. In addition to the foregoing groups, aliphatic and cyclic terpene alcohols may also be used.

The subject product can be also manufactured advantageously and effectively using hydrogen gas or saturated primary or secondary alcohols and hydrogen gas in combination in place of the above-listed alcohols.

The process of the present invention permits the use of copper-base or nickel-base or other known dehydrogenation or hydrogenation catalysts alone or in combination as such. Said catalysts may consists of, for example, dehydrogenation or hydrogenation catalysts such as reducing nickel, stabilizing nickel, copper-chrome, copper-zinc, copper and brass which contain at least one metallic element selected from the group consisting of Ni, Cr, Cu, Zn, Pt, and Pd. Among these catalysts, the copper-base catalyst is a preferable one.

Next, speaking of the conditions for reaction, the operating pressure, or, more exactly, reduced pressure, varies with the boiling point of the intended object or other materials associated with operation. In other words, higher degrees of evacuation are used for higher boiling substances and lower degrees of evacuation for lower boiling substances. High degrees of evacuation representing less than 1 mm. Hg expressed in the guage pressure are not advantageous. It would be better to conduct operation at such pressures as exceeding 1 mm. Hg, or, if possible, ranging from 10 mm. Hg to levels below atmospheric, for example, 700 mm. Hg. However, the outstanding feature of the present invention is that reaction can well proceed even at high evacuations, although the efficiency may be slightly reduced. The examples which follow disclose using pressures not exceeding 100 mm. Hg.

With respect to reaction temperatures, around 250–300° C. is usually preferable, where a copper-base catalyst is used. However, if an adequate catalyst is selected the subject reaction can take place when the temperature is maintained at more than 150° C. Since the vapor phase reaction involved in the process of the present invention takes place at much higher levels than the hydrogenation temperature or 100° C. of the previous method it is a continuation of instant reaction cycles.

Figure 3:
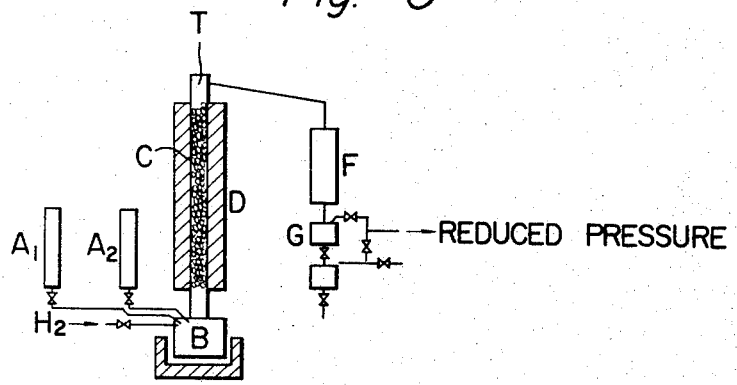
Figure 4:
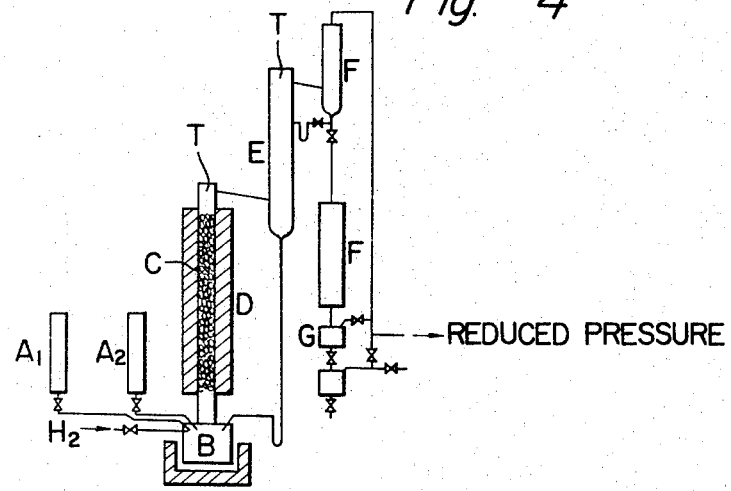

Next, the general operation of the process of the present invention will be outlined hereinafter with reference to FIGS. 3 and 4 showing the schematic diagrams of the reactor of the present invention. Describing the apparatus illustrated in FIG. 3, raw aromatic unsaturated aldehydes and saturated primary or secondary alcohols as a source of hydrogen enter the still B through the raw material tank $A_1$ and the saturated alcohol tank $A_2$, where they are evaporated. They react while passing through the reactor D which has previously been filled with the catalyst C. The product is condensed in the cooler F and collected into the receptacle G. FIG. 4 represents the case where hydrogen gas $H_2$ is used as a source of hydrogen for selective hydrogenation. In this case the vapor product leaving the reactor D is rectified in the rectifier E. High boiling unreacted raw unsaturated aldehydes and very small amounts of the corresponding saturated alcohols gneerated as by-product at this time are returned to the still B and thus the reaction cycle is repeated. On the other hand distillates from the rectifier E are the desired object, namely, low boiling aromatic saturated aldehydes of high purity. This product is condensed in the cooler F and collected into the receptacle G. Although FIGS. 3 and 4 respectively are simply an illustration of the raector, other reaction procedures including the fluidized bed process may also be applicable.

The flow rate of raw aromatic unsaturated aldehydes, saturated alcohols as a source of hydrogen and hydrogen gas can be controlled by the valve and also readings on the flow meter. While the supply of raw aromatic unsaturated aldehydes is mainly subject to the quantity of the catalyst charged, it is desirable to use the optimum operating conditions in accordance with the raw materials to be used.

It is preferable to charge saturated alcohols as a source of hdyrogen and hydrogen gas in a higher ratio for the latter in relation to the raw material. Where saturated alcohols are less available, operation can be efficiently conducted by the use of hydrogen gas in combination. Since hydrogen gas can be used by being circulated throughout the reaction system, it is very advantageous to adpust the supply of saturated alcohols as a source of hydrogen so as to maintain the heat balance of the reaction system, and also to use the corresponding type of alcohols to the raw aldehydes so that saturated carbonyl compounds obtained by dehydrogenation of the saturated alcohols used as a source of hydrogen can be made into the desired product or to apply other procedures in order to convert said carbonyl compounds into different desired products.

The process of the present invention will be more clearly understood with reference to the examples which follow. It should be noted, however, that the present invention is not limited to these examples.

EXAMPLE 1

A reactor filled with a copper-zinc base catalyst was charged with p - isopropyl - $\alpha$ - methyl cinnamic aldehyde (boiling point: 130 to 133° C./6 mm.; $n_D^{20}$ 1.5800; acid value: 2.08; aldehyde content: 99.7%) and cyclohexanol in the molar ratio of 2:8 in the vapor state at the same time. Reaction was conducted at temperatures of 265±5° C. and reduced pressure of 60 mm. Hg. As a result, it was confirmed gaschromatographically that p-isopropyl-$\alpha$-methyl cinnamic aldehyde had been converted into the quantitative equivalent of saturated aldehyde, namely, p - isopropyl - $\alpha$ - methyl hydrocinnamic aldehyde. The product was colorless and completely free from the yellow color characteristic of the raw p-isopropyl-$\alpha$-methyl cinnamic aldehyde. The gaschromatogram also showed that no unreacted raw material was present in the product. On the other hand, said gaschromatogram indicated the presence of the by-product of saturated alcohol, that is, p-isopropyl - $\alpha$ - methyl cinnamic alcohol. However, this quantity was negligible. It was also confirmed that there was no presence of another conceivable by-product of unsaturated alcohol, namely, p - isopropyl - $\alpha$ - methyl cinnamic alcohol.

FIG. 1–$a$ represents a gaschromatogram obtained by measurment of the reaction conducted by mixing p-isopropyl-$\alpha$-methyl cinnamic aldehyde and cyclohexanol in the molar ratio of 2:8, and FIG. 1–$b$ that of the reaction product. FIG. 1–$c$ is a gaschromatogram obtained by more sensitized measurement of the aforementioned FIG. 1–$b$ representing the reaction product. The notations 1, 2, 3, 4 and 5 shown in the diagrams were confirmed by said measurement to denote the following respectively:

(1) Cyclohexanol (saturated aliphatic alsohol as a source of hydrogen)
(2) Raw p-isopropyl-$\alpha$-methyl cinnamic aldehyde
(3) Cyclohexanone
(4) Desired product: p - isopropyl - $\alpha$ - methyl hydrocinnamic aldehyde
(5) By-product: p-isopropyl - $\alpha$ - methyl hydrocinnamic alcohol As clearly seen from the diagrams, it was confirmed by the aforementioned gaschromatograms that FIGS. b and c representing the reaction product contained no raw unsaturated aldehyde, namely, p-isopropyl-α-methyl cinnamic aldehyde as shown in FIG. a, but indicated the production of the corresponding saturated aldehyde, namely, p-isopropyl-α-methyl hydrocinnamic aldehyde. Also as seen from FIG. c, only small amounts of the corresponding saturated alcohol, namely, p-isopropyl-α-methyl hydrocinnamic alcohol, were observed, but the corresponding unsaturated alcohol, namely, p-isopropyl-α-methyl cinnamic alcohol was not discovered. Also this reaction generated extremely small amounts of by-products such as esters and acids. Thus it was confirmed that the process of the present invention quantitatively converted the raw unsaturated aldehyde, namely, p - isopropyl - α - methyl cinnamic aldehyde into the saturated aldehyde with the corresponding chemical structure.

EXAMPLE 2

The same reactor as used in Example 1 was charged with p-isopropyl - α - methyl cinnamic aldehyde and 2-octanol in the molar ratio of 1:9 in the vapor state at the same time. Reaction was conducted at temperatures of 265±5° C. and reduced pressure of 100 mm. Hg. As a result, it was confirmed gaschromatographically that p-isopropyl-α-methyl cinnamic aldehyde had been converted into the quantitative equivalent of saturated aldehyde, namely, p - isopropyl-α-methyl hydrocinnamic aldehyde. The product was colorless and completely free from the yellow color characteristic of the raw p-isopropyl-α-methyl cinnamic aldehyde. The gaschromatogram also showed that the product contained no unreacted raw material. On the other hand, the formation of the by-product of saturated alcohol, namely, p-isopropyl-α-methyl cinnamic alcohol was deemed negibible, as viewed from the gaschromatogram. Also the generation of other by-products such as esters and acids was extremely small.

Figure 2:
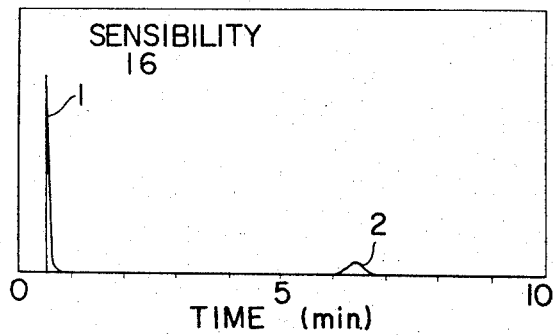
Figure 2:
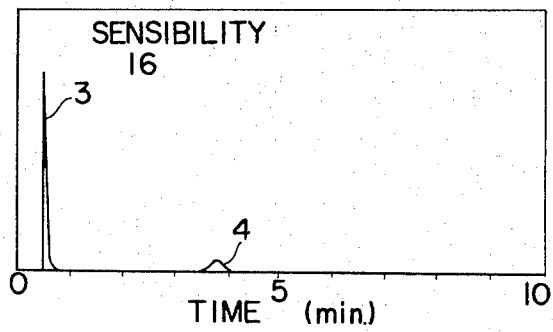
Figure 2:
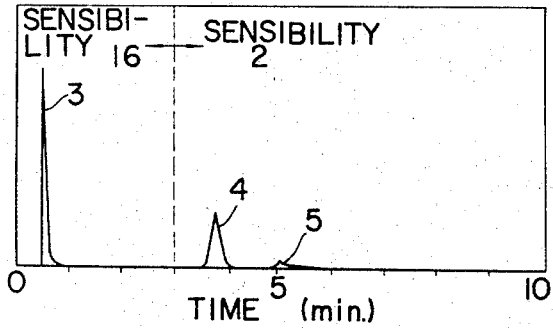

FIG. 2–a represents a gaschromatogram obtained by measurement of the reaction conducted by mixing p-isopropyl - α - methyl cinnamic aldehyde and methyl-n-hexylcarbinol in the molar ratio of 1:9, and FIG. 2–b that of the recation product. FIG. 2–c is a gaschromatogram obtained by more sensitized measurement of the aforementioned FIG. 2–b representing the reaction product. The notations 1, 2, 3, 4 and 5 shown in the diagrams were confirmed by said measurement to indicate the following respectively:

(1) Methyl-n-hexylcarbinol (saturated aliphatic alcohol as a source of hydrogen)
(2) Raw p-isopropyl-α-methyl cinnamic aldehyde
(3) Methyl-n-hexylketone
(4) Desired product: p-isopropyl - α - methyl hydrocinnamic aldehyde
(5) By-product: p-siopropyl - α - methyl hydrocinnamic alcohol In this case, too, as clearly seen from FIGS. 2–a, 2–b, and 2–c, it was confirmed that the process of the present invention had quantitatively converted the raw unsaturated aldehyde of p-isopropyl-α-methyl cinnamic aldehyde into the saturated aldehyde with the corresponding chemical structure.

EXAMPLE 3

The same reactor as used in Example 1 was charged with p-isopropyl-α-methyl cinnamic aldehyde and cyclohexanol in the molar ratio of 35:65 at the same time. About one half of the raw p-isopropyl-α-methyl cinnamic aldehyde was converted into the corresponding saturated aldehyde, the balance being unreacted raw material. The generation of other by-products was as negligibly small as in Examples 1 and 2. In this case, too, unreacted raw material remained in the reaction system. However, the reacted raw unsaturated aldehyde was quantitatively converted into the corresponding aldehyde with a selection ratio of approximately 100%.

EXAMPLE 4

Raw p-isopropyl-α-methyl cinnamic aldehyde and p-isopropyl-α-methyl hydrocinnamic alcohol were charged in the molar ratio of 35:65 at the same time into the reactor which had previously been filled with a copper-zinc base catalyst. Reaction was carried out at temperatures of 260–270° C., and reduced pressure of 100 mm. Hg. As a result, about ⅚ of the raw unsaturated aldehyde of p-isopropyl-α-methyl cinnamic aldehyde was converted into the saturated aldehyde of p-isopropyl-α-methyl hydrocinnamic aldehyde, the remaining ⅙ being present as unreacted raw material in the reaction product. However, the generation as by-product of unsaturated alcohol, namely, p-isopropyl-α-methyl cinnamic alcohol, was not observed. It was confirmed that the reacted raw unsaturated aldehyde, namely, p-isopropyl-α-methyl cinnamic aldehyde had been quantitatively converted into the corresponding desired product of saturated aldehyde, namely, p-isopropyl-α-methyl hydrocinnamic aldehyde. It was also confirmed that the saturated primary alcohol as a source of hydrogen, namely, p-isopropyl-α-methyl hydrocinnamic alcohol, had been dehydrogenated into the same compound as the desired product, namely, p-isopropyl-α-methyl hydrocinnamic aldehyde.

EXAMPLE 5

When, in the case of Example 4, the apparatus illustrated in FIG. 4 was employed and hydrogen gas was additionally charged as a source of hydrogen, raw p-isopropyl-α-methyl cinnamic aldehyde and unreacted hydrogen source, namely, p-isopropyl-α-methyl hydrocinnamic alcohol were rectified in the rectifier E in FIG. 4 due to their high boiling points and then returned to the still B, thus the reaction cycle being repeated. Only the desired product of low boiling saturated aldehyde, namely, p-isopropyl-α-methyl hydrocinnamic aldehyde was distilled out. It was confirmed that very effective selective hydrogenation was possible.

EXAMPLE 6

The same reactor as used in Example 1 was charged with p-isopropyl-α-methyl cinnamic aldehyde and hydrogen gas in the molar ratio of about 1:3 at the same time. As a result of reaction, it was confirmed that about one half of the raw unsaturated aldehyde, namely, p-isopropyl-α-methyl cinnamic aldehyde had been converted into the corresponding saturated aldehyde, namely, p-isopropyl-α-methyl hydrocinnamic aldehyde, the balance being mostly unreacted raw material, that the generation of by-products was as negligibly small as in the foregoing examples and also that in this case, too, the selectivity of hydrogenation approximated 100%.

EXAMPLE 7

When, in the case of Example 4, the apparatus illustrated in FIG. 4 was employed only the product of low boiling saturated aldehyde among the reaction products was rectified and distilled out. The unreacted raw material of high boiling unsaturated aldehyde was returned to the reactor, thus repeating the reaction cycle. This operating procedure made it possible to convert quantitatively most of the raw unsaturated aldehyde into the corresponding saturated aldehyde.

EXAMPLE 8

When, in the case of Example 3, hydrogen gas was additionally charged at an adequate flow rate efficiency was improved due to the higher rate of conversion to the corresponding aldehyde.

EXAMPLE 9

6 g. of the Raney nickel catalyst was added to 1 mol of the raw material of aromatic unsaturated aldehyde, namely, p-isopropyl-α-methyl cinnamic aldehyde. The ordinary selective hydrogenation of about 1 mol was carried out in advance at temperatures of 70 to 74° C. and under pressure. However, the selectivity of said hydrogenation was not satisfactory. The gaschromatogram also indicated that the formation of the desired product of saturated aldehyde, namely, p-isopropyl-α-methyl hydrocinnamic aldehyde accounted for only about 38% and that the balance consisted of about 46% of the corresponding saturated alcohol, namely, p-isopropyl-α-methyl hydrocinnamic alcohol and about 16% of the unreacted raw material of unsaturated aldehyde, namely, p-isopropyl-α-methyl cinnamic aldehyde.

When the product obtained by ordinary hydrogenation having the aforementioned composition was reacted by the process of the present invention in a reactor which had been filled with a copper-zinc base catalyst and heated to 260 to 270° C. most of the reaction product consisted of the desired object of saturated aldehyde, namely, p-isopropyl-α-methyl hydrocinnamic aldehyde, the balance being small amounts of saturated alcohol, namely, p-isopropyl-α-methyl hydrocinnamic alcohol and negligible volumes unreacted unsaturated aldehyde.

EXAMPLE 10

The product of ordinary selective hydrogenation described in Example 14 and cyclohexanol were charged in the weight ratio of 1:1 and reacted in the same manner as in Eaxmple 1 using the process of the present invention. The resultant reaction product consisted of cyclohexanone, the desired object of saturated aldehyde, namely, p-isopropyl-α-methyl hydrocinnamic aldehyde, and small amounts of saturated alcohol, namely, p-isopropyl-α-methyl hydrocinnamic alcohol and contained no unreacted raw material of unsaturated aldehyde, namely, p-isopropyl-α-methyl cinnamic aldehyde.

EXAMPLE 11

The product of ordinary selective hydrogenation described in Example 14 and hydrogen gas as a source of hydrogen were introduced into the apparatus illustrated in FIG. 4. Reaction was carried out in the same manner as described in Examples 5 and 7. As a result, it was confirmed that it was possible to manufacture with high efficiency the desired object of saturated aldehyde, namely, p-isopropyl-α-methyl hydrocinnamic aldehyde. The reaction product contained no unreacted raw material of unsaturated aldehyde, namely, p-isopropyl-α-methyl cinnamic aldehyde.

EXAMPLE 12

It was confirmed that the p-isopropyl-α-methyl hydrocinnamic aldehyde (cyclamen aldehyde) obtained by the processes of Examples 1 to 11 was a very slightly yellow, or approximately colorless liquid with the boiling point of 104 to 105° C./3 mm. Hg, $d_4^{25}$ 0.947, $n_D^{20}$ 1.5064 and acid value 1.06, and containing 95.65% of the aldehyde obtained by the hydroxylamine method and had a fragrant smell like that of the cyclamen, lily-of-the-valley or lilac.

EXAMPLE 13

In Example 1, p-t-butyl-α-methyl cinnamic aldehyde was used in place of the p-isopropyl α-methyl cinnamic aldehyde in the same molar ratio. Almost all this raw material was quantitatively converted into the corresponding saturated aldehyde, namely, p-t-butyl-α-methyl hydrocinnamic aldehyde. This product was confirmed to be a very slightly yellow, or approximately colorless liquid with a boiling point of 126 to 127° C./6 mm. Hg, $n_D^{20}$ 1.5050, $d_4^{25}$ 0.9390 and acid value 1.54, and containing 98.52% of the aldehyde obtained by the hydroxylamine method, and have a sweet smell similar to that of the lilly.

EXAMPLE 14

In Example 2, p-sec-butyl-α-methyl cinnamic aldehyde was charged in place of the p-isopropyl-α-methyl cinnamic aldehyde in the same molar ratio. Almost all this raw material was quantitatively converted into the corresponding saturated aldehyde, namely, p-sec-butyl-α-methyl hydrocinnamic aldehyde. This product was confirmed to be a very slightly yellow, or approximately colorless liquid with a boiling point of 106 to 107° C/1.5 mm. Hg, $n_D^{20}$ 1.5030, $d_4^{25}$ 0.9391, acid value 1.84, and containing 98.3% of the aldehyde obtained by the hydroxylamine method and have fragrance similar to that of the cyclamen or lily.

EXAMPLE 15

In Example 1, α-amyl cinnamic aldehyde was used in place of the p-isopropyl-α-methyl cinnamic aldehyde in the same molar ratio. Almost all this raw material was quantitatively converted into the corresponding saturated aldehyde, namely, α-amyl-hydrocinnamic aldehyde. This product was confirmed to be a very slightly yellow liquid with a boiling point of 126 to 128° C./4 mm. Hg, $n_D^{20}$ 1.4990, acid value 2.16, and containing 98.1% of the aldehyde obtained by the hydroxylamine method and have a sweet smell like that of the jasmine.

EXAMPLE 16

In Example 2, α-methyl cinnamic aldehyde was used in place of the p-isopropyl-α-methyl cinnamic aldehyde in the same molar ratio. Almost all this raw material was quantitatively converted into the corresponding saturated aldehyde, namely, α-methyl hydrocinnamic aldehyde. This product was confirmed to be a very slightly yellow liquid with a boiling point of 95 to 96° C/10 mm. Hg, $d_4^{20}$ 0.9204, $n_D^{20}$ 1.5110, acid value 1.45, and containing 98.7% of the aldehyde obtained by the hydroxylamine method and have fragrance like that of the hyacinth.

Having described the specification, we claim:

1. A process for producing cyclamen aldehyde and derivatives thereof, which process comprises reacting in the vapor phase at least one aromatic aldehyde of the formula:

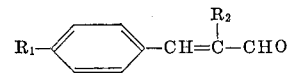

wherein $R_1$ is a member selected from the group consisting of hydrogen, methyl, ethyl, isopropyl, sec-butyl, and t-butyl and $R_2$ is a member selected from hydrogen, methyl, ethyl, n-propyl, n-butyl, n-amyl and n-hexyl, $R_1$ and $R_2$ being different radicals, with at least one compound selected from the group consisting of saturated primary alcohols, saturated secondary alcohols and hydrogen in the presence of a catalyst comprising at least one member selected from the group consisting of Ni, Cr, Cu, Zn, Pt and Pd, at a temperature of about 150° to 500° C. and a reduced pressure not exceeding 100 mm. Hg, to thereby hydrogenate only in the double bond of the side chain of the aromatic aldehyde.

2. Process described in claim 1 wherein the aforementioned saturated primary alcohols and saturated secondary alcohols are such saturated alcohols as containing up to 15 carbons.

References Cited

UNITED STATES PATENTS

| | | | |
|---|---|---|---|
| 1,844,013 | 2/1932 | Knorr et al. | 260—599 |
| 2,066,496 | 1/1937 | Taylor | 260—586 |
| 2,825,743 | 3/1958 | MacLean et al. | 260—599 |
| 2,875,131 | 2/1959 | Carpenter et al. | 260—599 |

OTHER REFERENCES

Heston et al.: Jour. Amer. Chem. Soc. (1929), vol 51, p. 2589.

BERNARD HELFIN, *Primary Examiner.*

U.S. Cl. X.R.

260—586, 596, 603